US008418102B2

(12) United States Patent
Brown

(10) Patent No.: US 8,418,102 B2
(45) Date of Patent: Apr. 9, 2013

(54) OPTIMIZATION OF LIBRARY SLEW RATIO BASED CIRCUIT

(75) Inventor: Jeffrey Scott Brown, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 1041 days.

(21) Appl. No.: 12/111,836

(22) Filed: Apr. 29, 2008

(65) Prior Publication Data

US 2009/0267671 A1 Oct. 29, 2009

(51) Int. Cl.
*G06F 9/455* (2006.01)
*G06F 17/50* (2006.01)

(52) U.S. Cl. .......................... 716/108; 716/113; 716/134

(58) Field of Classification Search .................. 716/108, 716/113, 134
See application file for complete search history.

(56) References Cited

U.S. PATENT DOCUMENTS

| | | | | |
|---|---|---|---|---|
| 6,110,219 A | * | 8/2000 | Jiang | 703/19 |
| 6,492,855 B1 | * | 12/2002 | Pasqualini | 327/211 |
| 6,629,298 B1 | * | 9/2003 | Camporese et al. | 716/113 |
| 7,299,438 B2 | * | 11/2007 | Hosono | 716/113 |
| 7,340,712 B2 | * | 3/2008 | Correale, Jr. | 716/102 |
| 7,716,612 B1 | * | 5/2010 | Gupta et al. | 716/132 |
| 2004/0230921 A1 | * | 11/2004 | Hathaway et al. | 716/2 |
| 2004/0230924 A1 | * | 11/2004 | Williams et al. | 716/2 |
| 2005/0060676 A1 | * | 3/2005 | Matsumura et al. | 716/6 |
| 2006/0015831 A1 | * | 1/2006 | Varshney et al. | 716/4 |
| 2006/0206845 A1 | * | 9/2006 | Rao et al. | 716/6 |
| 2006/0273821 A1 | * | 12/2006 | Correale | 326/31 |

* cited by examiner

*Primary Examiner* — Suresh Memula
(74) *Attorney, Agent, or Firm* — William W. Cochran; Cochran Freund & Young LLC

(57) ABSTRACT

Disclosed is a technique for providing minimal sequential overhead in a flip-flop circuit. Equalization of setup times is achieved in one embodiment. In addition, delays in clock to Q can be equalized for both rising data transitions and falling data transitions. Large setup times are not required since optimization techniques equalize setup times for both rising and falling data transitions.

4 Claims, 6 Drawing Sheets

Fig. 1A
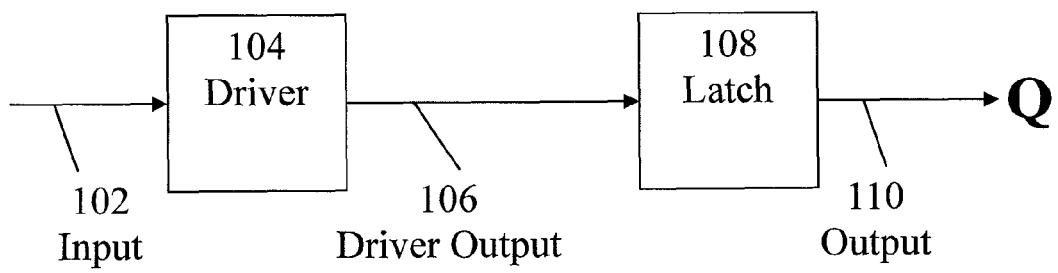
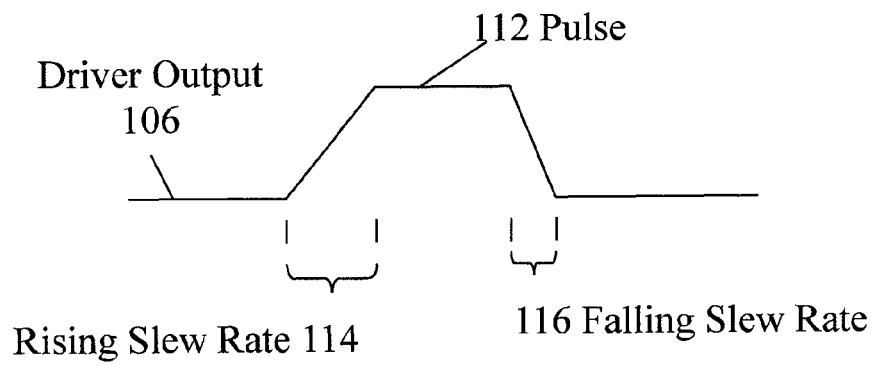
Fig 1B

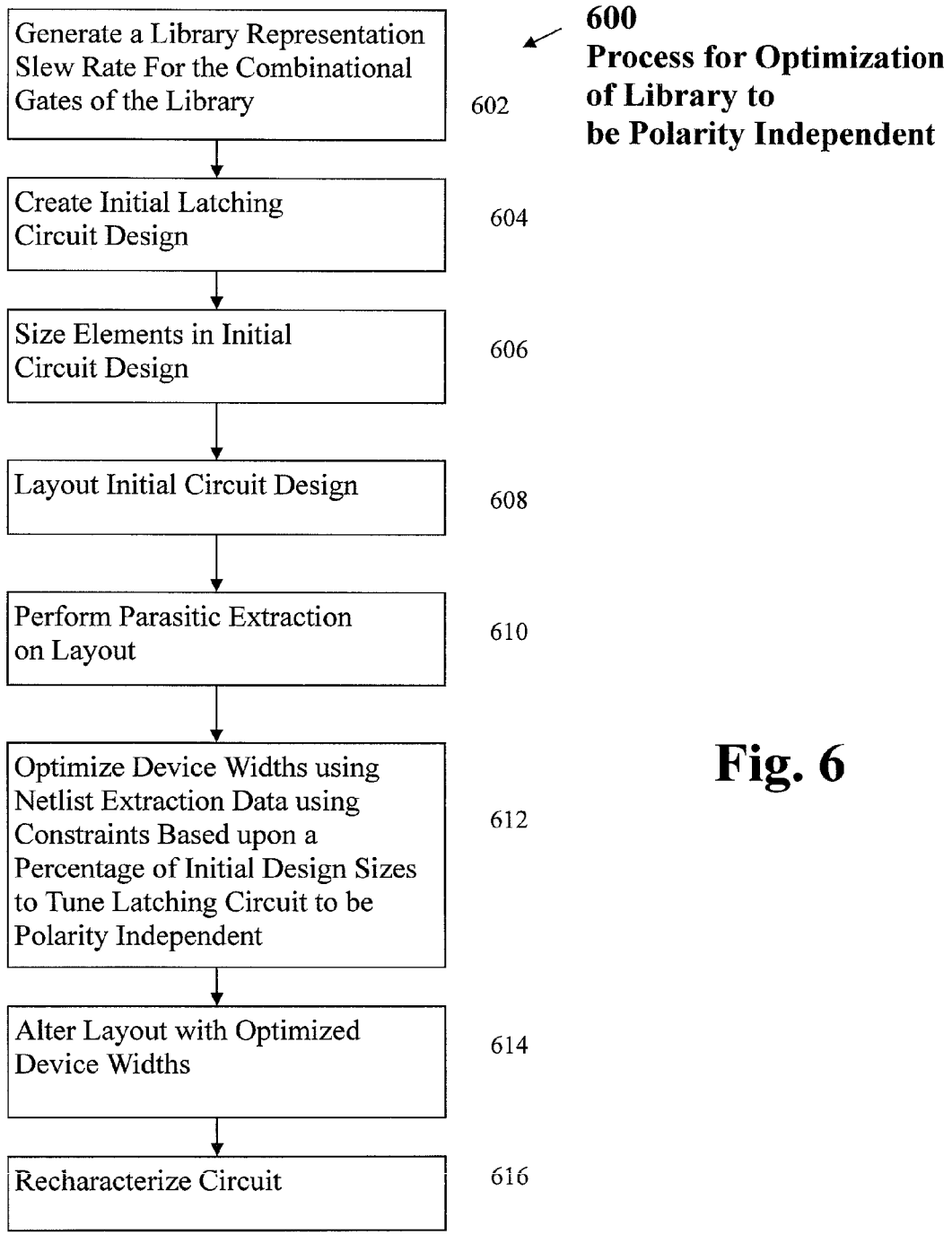

OPTIMIZATION OF LIBRARY SLEW RATIO BASED CIRCUIT

BACKGROUND OF THE INVENTION

It is desirable to have component parts of electronic circuits to operate with each other to produce accurate and quick results. Higher speed operation allows devices to operate and respond more quickly.

SUMMARY OF THE INVENTION

An embodiment of the present invention may therefore comprise a method of minimizing sequential overhead in a latching circuit design comprising: generating a library representation of slew rates for rising and falling data transitions; creating an initial latching circuit design; performing parasitic extraction of the initial latching circuit design; optimizing device widths of components of the initial latching current design by less than approximately 15 percent of device widths of the initial latching circuit design to generate a timing optimized latching circuit that is substantially input transition direction independent; generating a layout of the optimized latching circuit; recharacterizing the altered layout of the optimized latching circuit.

An embodiment of the present invention may further comprise a latching circuit that has reduced sequential overhead comprising: a first pass-gate that has an N-channel device that has a device width that has been substantially optimized using hspice optimization routines, and a P-channel device that has a device width that has been substantially optimized from an initial circuit layout using hspice optimization routines; a master loop having an inverter that has a P-channel device that has a device width that has been substantially optimized, and an N-channel device that has a device width that has been substantially optimized, from an initial circuit layout using hspice optimization routines; a second pass-gate that has an N-channel device that has a device width that has been substantially optimized from an initial circuit layout and a P-channel device that has been substantially optimized from an initial circuit layout, using hspice optimization routines; a slave loop having a second inverter that has a P-channel device that has been substantially optimized from an initial circuit layout and an N-channel device that has been substantially optimized from an initial circuit layout, using hspice optimization routines.

BRIEF DESCRIPTION OF THE DRAWINGS

FIG. 1A is a block diagram of a driver/latch circuit employing one embodiment of the present invention.

FIG. 1B is an illustration of a data pulse having disparate rising and falling slew rates.

FIG. 6 is a flow diagram of one embodiment of a process for optimization of a latching circuit to be polarity independent.

DETAILED DESCRIPTION OF THE EMBODIMENTS

Figure 2:
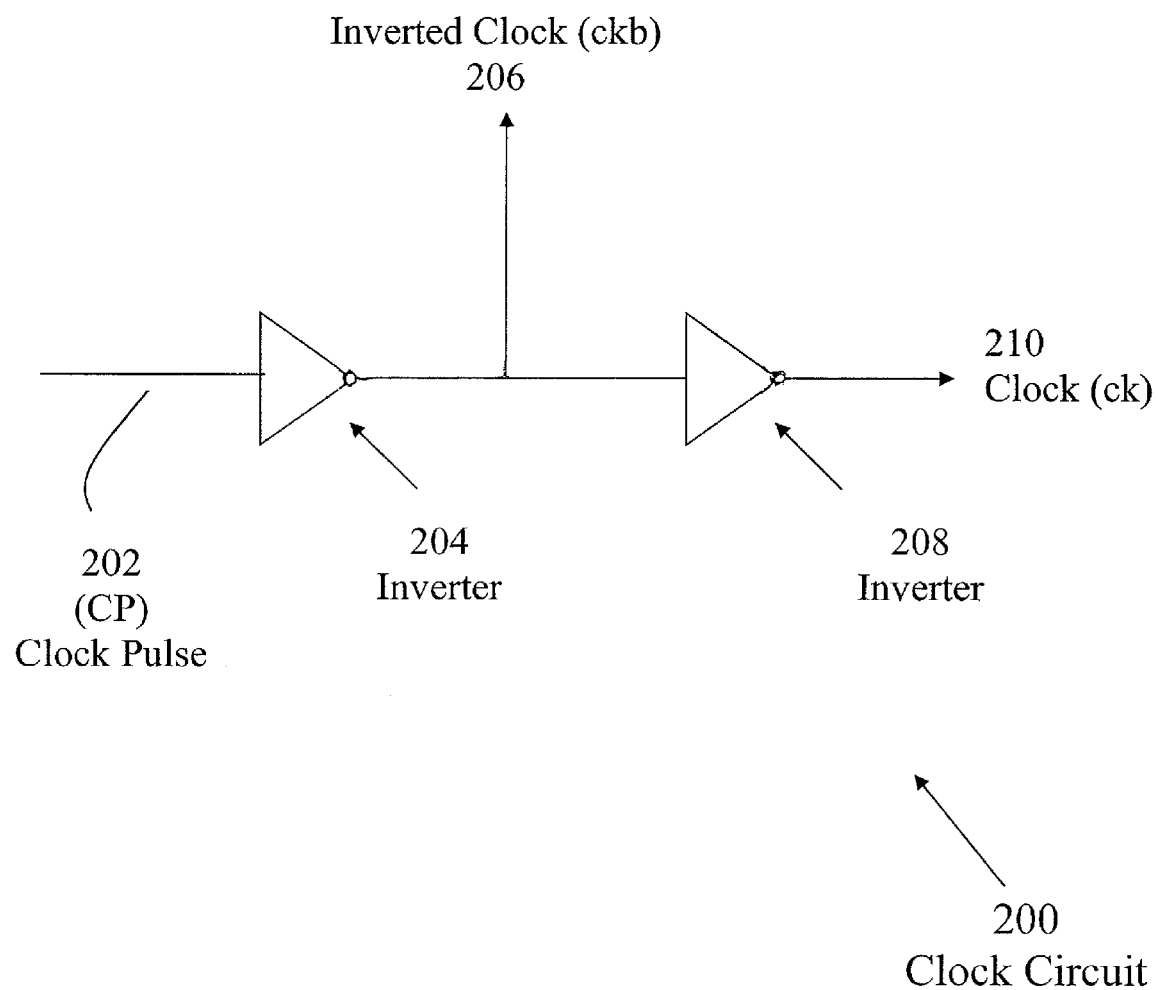
FIG. 2 is a schematic diagram of a clock circuit.

FIG. 1A is a block diagram of a driver and latch circuit. As shown in FIG. 1A, driver 104 and latch 108 are embedded in an integrated circuit device. Input 102 comprises a data signal that is driven into a driver 104 to produce a driver output data signal 106 that is applied to latch 108. Latch 108 latches the driver output data signal 106 and produces an output 110 labeled Q.

As shown in FIG. 1B, the driver output 106 produces an output pulse 112 that has a rising slew rate 114 and a falling slew rate 116. As shown in FIG. 1B, the rising slew rate 114 is slower than the falling slew rate 116. For any given technology, there is a certain P:N ratio for all of the drivers which results, typically, with a weak P-channel compared to a stronger N-channel. Hence, the rising slew rate 114 is slower than the falling slew rate 116. In accordance with one embodiment, the device sizes in the latch 108 are optimized so that the calculated setup times for both rising data and falling data are substantially the same. In this fashion, static timing analysis tools do not require that the longest setup time be dictated by the design, and there is a reduction in the rise/fall setup time disparities so as to minimize sequential overhead. In other words, the circuitry of the latch 108 is designed to have the same setup time requirements, even though the rising data has a longer rising slew rate 114, than the faster falling data, which has a falling slew rate 116. The slew rates 114, 116, illustrated in FIG. 1B, are calculated by the library using test cells to provide accurate data. For example, most combinational logic drivers in a typical library utilize the same P:N ratio. As a result, a relatively constant ratio of the rising to falling output slew rate is produced across all of the gates of the library. The slew rate ratio is used for tuning the setup times for latch 108. The components of the latch 108 are tuned using the library slew rates so that both the rising and falling input data setup times are nearly equal when analyzed by a static timing analysis tool. This produces a minimized sequential element overhead across the circuit design, as disclosed more fully below.

FIG. 2 is a schematic diagram of a clock circuit 200. The clock pulse 202 is input to an inverter 204. The output of inverter 204 is an inverted clock pulse (ckb) 206. The inverted clock pulse 206 is applied to another inverter 208 to produce the clock signal (ck) 210. Hence, both an inverted clock 206 and a clock signal 210 are generated by the clock circuit 200.

Figure 3:
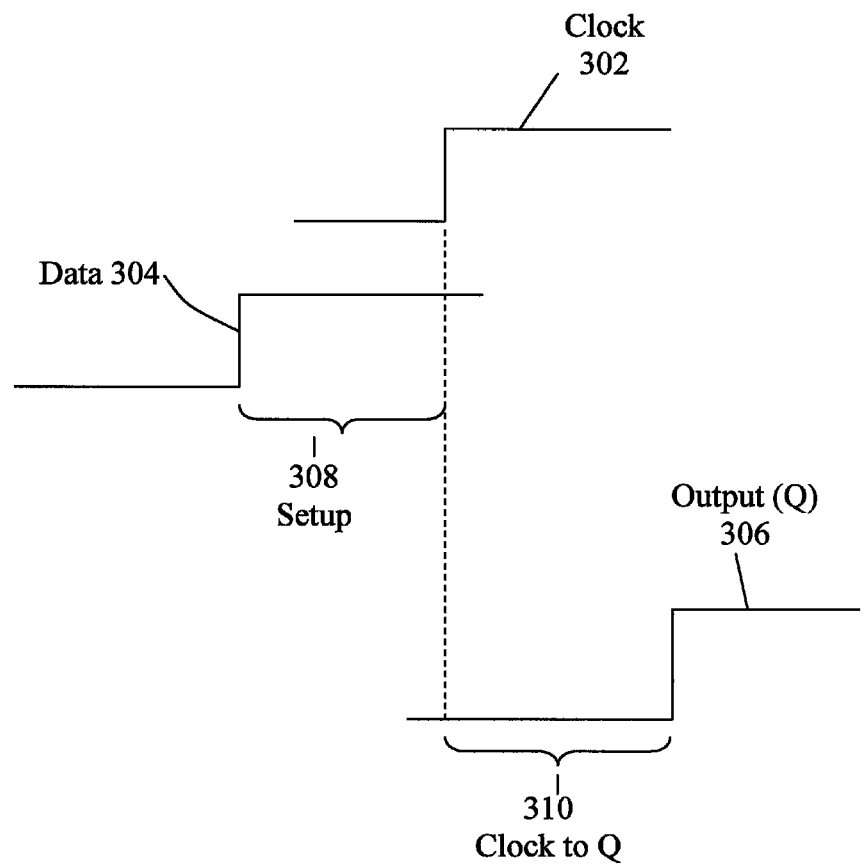
FIG. 3 is a timing diagram for a rising data pulse.

FIG. 3 illustrates the setup time 308, as well as the clock to Q time 310, for a rising data pulse 304. As shown in FIG. 3, the data pulse 304 precedes the clock pulse 302 by a certain setup time 308. It is desirable to reduce the setup time 308 to increase the speed of operation of the latch circuit. As also shown in FIG. 3, the clock to Q time 310 is illustrated, which is the time between the transition of the clock pulse 302 to the generation of output (Q) 306. For long setup times, a measured clock to Q time will be produced. As the setup time 308 is reduced, there is a point at which the clock to Q time 310 will increase. Design constraints dictate that setup times should not be less than an amount that causes the clock to Q time 310 to increase more than 10 percent over the clock to Q time 310 for long setup times.

Figure 4:
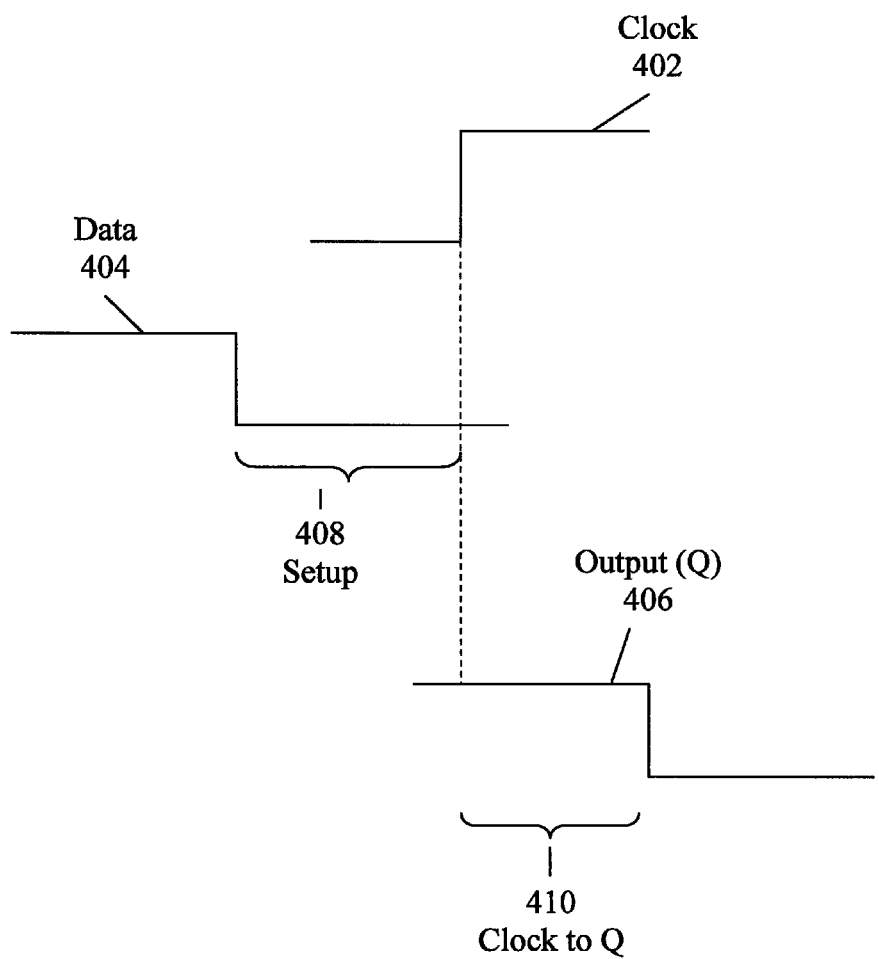
FIG. 4 is a timing diagram for a falling data pulse.

FIG. 4 is an illustration of the setup time 408 and clock to Q time 410 for a falling data pulse 404. As shown in FIG. 4, the time between the falling data pulse 404 and the clock pulse 402 is the setup time 408. The time between the clock pulse 402 and the falling output pulse (Q) 406 is a clock to Q time 410. Again, for a long setup time 408, the clock to Q time 410 will have a specific measurable period. As the setup time 408 is reduced by moving the falling data pulse 404 closer to the clock pulse 402, at some point, the clock to Q time 410 starts increasing. The design constraints dictate that the setup time 408 should not be less than an amount that causes the clock to Q time 410 to increase more than 10 percent over the clock to Q time 410 that is created by a long setup time 408.

Latch and flip-flop library designs are not optimized for equal rising and falling data setup times with respect to slew rates of drivers used in library designs. As a result, in situ latching elements, such as flip-flops, have setup time constraints that reflect a disparity between rising and falling input data. Hence, the worse case scenario must be adopted using the setup time constraints, i.e., the longest setup times. The calculated setup times 308, 408 for a rising data pulse 304 and a falling data pulse 404, respectively, are typically different in a latch circuit due to the weak P-channel compared to the stronger N-channel in the library drivers. The driver/latch circuit 100 must be designed for the longer setup time of latch 108, since it is not known whether the driver output 106 is a rising data pulse 304, or a falling data pulse 404. Hence, latch/driver circuit 100 must be designed for the worse case scenario (longest setup time) to provide sufficient setup time for either a falling or rising pulse. Of course, the setup times 308, 408, which are not equal, are dependent upon the slew rates 114, 116, which are also not equal.

Figure 5:
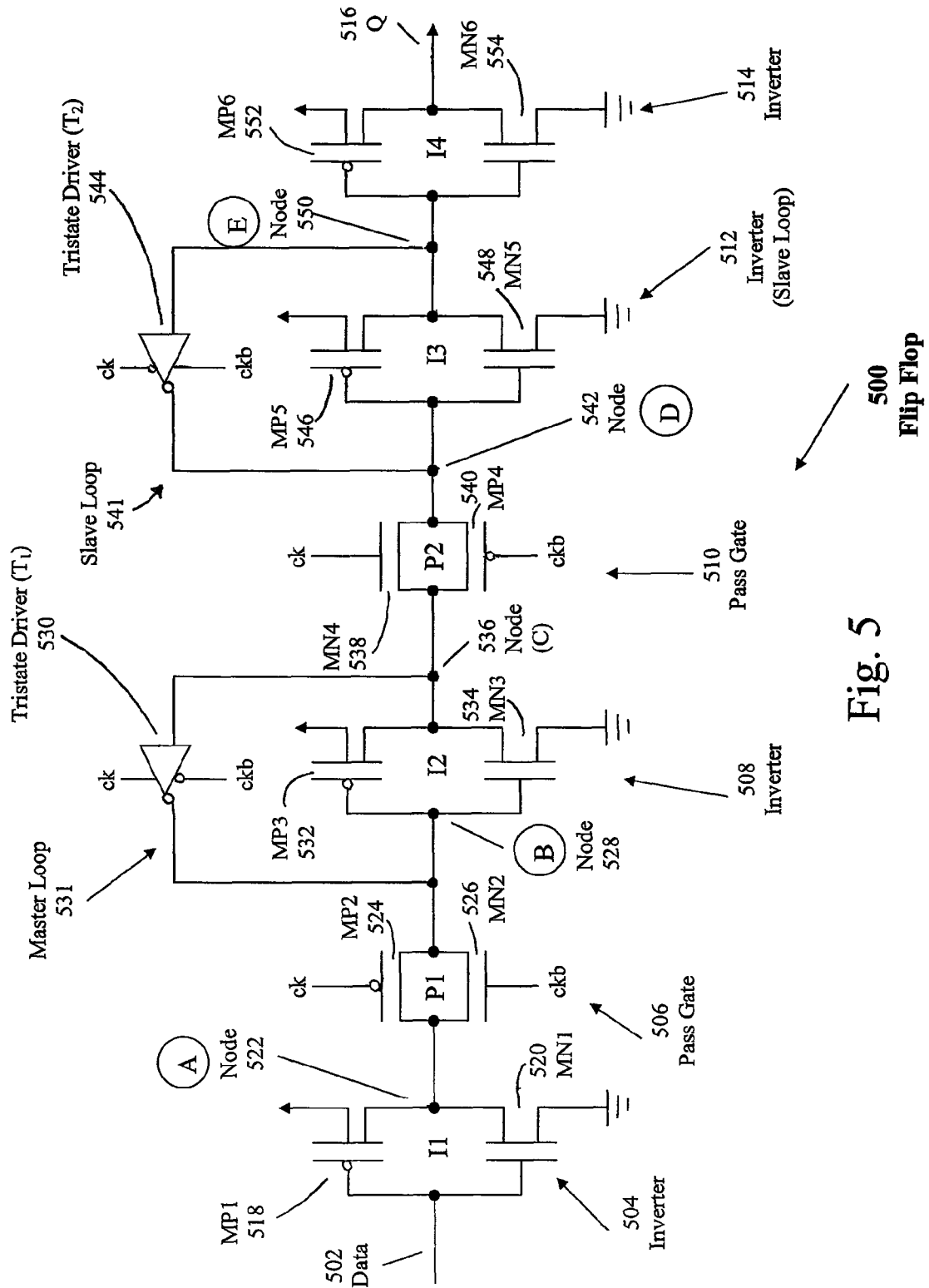
FIG. 5 is a schematic diagram of one embodiment of a flip-flop circuit.

FIG. 5 is a schematic diagram of a flip-flop 500. As shown in FIG. 5, the input data 502, which corresponds to driver output 106 (FIG. 1), is applied to inverter 504. Inverter 504 has a P-channel device 518 and an N-channel device 520. The output of the inverter 504, at node 522, is applied to pass-gate 506. Pass-gate 506 includes a P-channel device 524 that is controlled by the clock signal (ck) and an N-channel device 526 that is controlled by the inverted clock signal (ckb). The output at node 528 of the pass-gate 506 is applied to inverter 508 and a tristate driver ($T_1$) 530 to generate a master loop 531. Inverter 508 includes a P-channel device (MP3) 532 and an N-channel device (MN3) 534. Tristate driver ($T_1$) 530 is connected to both node 528 and node 536, which is connected to the output of inverter 508. Node 536 is connected to the input of pass-gate 510. Pass-gate 510 includes an N-channel device (MN4) 538, which is activated by the clock signal (ck) and a P-channel device (MP4) 540, which is controlled by the inverted clock pulse (ckb). The output node 542 of pass-gate 510 is applied to the input of inverter 512 and tristate driver ($T_2$) 544, which create a slave loop 541. Inverter 512 includes a P-channel device (MP5) 546 and an N-channel device (MN5) 548. Node 550 is connected to the input of tristate driver ($T_2$) 544. The output of tristate driver 544 is connected to node 542 to generate slave loop 541. Node 550 is connected to the input of inverter (I4) 514. Inverter (I4) 514 includes a P-channel device (MP6) 552 and an N-channel device (MN6) 554. The output (Q) 516 is produced at the output of inverter 514. The inverter (I2) 508 is the feed forward inverter for the master loop that includes tristate driver ($T_1$) 530, while inverter (I3) 512 is the feed forward inverter for the slave storage loop 541. When the clock (ck) is low, data is allowed to flow from input 502 through inverter (I1) 504, pass-gate (P1) 506 and inverter (I2) 508 and stabilize at node 536. When the clock (ck) transitions high, pass-gate (P1) 506 closes and pass-gate (P2) 510 opens. At this point, the data is captured in the master loop 531 when the tri-state driver (T1) 530 turns on. The data that was settled at node 536 is allowed to pass through pass-gate (P2) 510, inverter (I3) 512 and inverter (I4) 514 to Q 516.

As set forth above, as the period between the transition of the input data 502 and the clock pulse becomes shorter, at some point the clock to Q delay will increase, which is limited to a 10 percent increase. When this occurs, the data setup time is measured from the data transition to the clock transition.

The increase in clock to Q delay is the result of node 536 not fully stabilizing prior to the time when pass-gate ($P_2$) 510 opens.

This process of determining the setup time is done for both rising and falling input data. If the assumption is made that the delay from node (C) 536 to output (Q) 516 is constant for both rising and falling data, and the goal is to obtain equal setup times for flip-flop 500 for both rising and falling data, then it is necessary to equalize the delay from the data input 502 to node C regardless of the polarity of the data input 502. For example, if a data rising transition causes node (C) 536 to rise at 30 ps, but a falling data transition causes node (C) 536 to fall in 20 ps, then the device sizes in inverter 504, pass-gate 506 and inverter 508 can be adjusted to equalize the rising and falling delays to node (C) 536. An alteration to speedup the rising data pulse at node (C) 536 can be achieved by making some of the devices associated with the falling data transition smaller. This slows down the falling data propagation and also unloads each of the nodes due to smaller device sizes, which would, in turn, speedup the rising data propagation. For example, with respect to inverter 508, for a rising data transition, the input to inverter 508 (node 528) falls and transistor (MP3) 532 turns on. For a falling data transition, node B rises and transistor (MN3) 534 turns on. Since it is desirable to speedup the rising data transition, transistor (MN3) 534 is made smaller. Making transistor (MN3) 534 smaller unloads node 528 by reducing the gate capacitance of inverter 508. This, in turn, increases the slew rate at node 528 and speeds up the delay through transistor (MP3) 532, which is associated with a rising data input propagation. The smaller transistor (MN3) 534 also slows down the falling data signal propagation to node 536.

A similar approach can be used with pass-gate (P1) 506. For rising input data 502, pass-gate (P1) 506 passes low data from node 522 to node 528 because of inverter 504. For falling data 502, pass-gate (P1) 506 passes high data from node 522 to node 528. In order to speedup the propagation of rising input data from node 522 to node 528, the size of the N-channel device (MN2) 526 in pass-gate 506 is increased. In addition, the size of the P-channel device (MP2) 524 in pass-gate 506 is decreased to slow down the falling data from node 522 to node 528.

Although the device sizes in inverters 504, 514 are not changed in the examples given above, the size of these devices could also be changed. The sizes of the components in inverter 514 in a standard cell library are granular sizes (1×, 2×, etc.), and are fixed for a certain cell. The sizes of inverters 204, 208 in clock circuit 200 of FIG. 2 can also be altered depending on the load changes caused by size changes in pass-gates 506, 510.

As set forth above, it was assumed that there were equal clock to Q delays from node 536 to output (Q) 516 for both rising and falling data signals. In accordance with that assumption, it would only be necessary to equalize data propagation times from the data input 502 to node 536 for both rising and falling input data to equalize the entire data propagation time from data to Q. However, in actuality, the clock to Q times for rising and falling data are different. The actuation of the pass-gate (P2) 510 causes a portion of this disparity. For example, when the rising clock pulse allows data to pass through pass-gate 510, the inverted clock signal B applied to pass-gate 510 will be a falling pulse, which opens P-channel device (MP4) 540 prior to the time when the clock pulse rises to open the N-channel device (MN4) 538 of pass-gate 510. Depending upon the polarity of the data waiting to pass through pass-gate 510, this will affect the delay through pass-gate 510. If data is high at node 536, then the early opening of P-channel component (MP4) 540 will allow the positive data signal to pass through the pass-gate 510. In turn, if low data is waiting at node 536, the P-channel device (MP4) 540 will attempt to pass the low data signal through the pass-gate 510. However, the low data signal will not be well driven to node 542 until the N-channel device (MN4) 538 is later asserted by the clock pulse. The effects on N-channel device (MN5) 548, P-channel device (MP5) 546 and tri-state driver (T$_2$) 544 are similar to those described with respect to inverter 508 and master loop 531. Similarly, N-channel device (MN6) 554 and P-channel device (MP6) 552, that are included in inverter 514, have effects that are similar to the devices in inverter 504. The same techniques can be used to alter the timing of pass-gate 510, inverter 512 and inverter 514 to alter the timing of these devices for different data polarities through nodes 542, 550 to the output (Q) 516.

FIG. 6 discloses a process 600 for optimization of the latching circuit 500 (FIG. 5) to be polarity independent. As shown in FIG. 6, a library representation of the slew rate is generated for the combinational gates of the library. A low drive inverter can be used to obtain these values, such as a four fan-out circuit of inverters in which the first inverter drives four inverters, and one of those inverters in turn drives four more inverters. The slew rates on the output of an inverter in that type of structure can be used to represent the ratio and values of the data input signals into the latching element during optimization. For example, in G65LP the ratio of slew rates was determined to be 43 ps/28 ps for rising/falling data signals when measured at 30 percent/70 percent transition points. An initial latching circuit design is then created at step 604. At step 606, the elements of the initial latching circuit design are sized. At step 608, the initial circuit design is laid out. At step 610, parasitic extraction is performed on the layout generating a netlist of extraction data for the initial circuit design layout. Both steps 608, 610 are optional, but provide more accurate results. At step 612, the device widths are optimized, as described above, using the netlist extraction data and constraints based upon a percentage of the initial design sizes to tune the latching circuit to be polarity independent.

Again, one of the constraints is that device sizes do not exceed approximately 10 to 15 percent of the device sizes of the initial layout. This constraint is used to ensure that the parasitic data remains valid.

For optimization of flip-flop 500, hspice optimization routines can be utilized. Concurrent goals can be set on rising data setup, falling data setup, rising clock to Q and falling clock to Q delays, such that rising/falling data setup times are equal, as well as rising/falling clock to Q delays. An example of routines that can be used include:

Set the FO4 slew rates for use in the deck
. . .
+trd='43p/0.4'
+tfd='28p/0.4'
. . .
Parameterize some of the device sizes in the netlist and allow a set range of variation of each device in the datapath. Allow the optimization to work on device widths only and limit the amount of variation to reduce the error from not having the device parasitics scale appropriately with the device widths.
. . .
.param dpchw=opt1 (0.64μ, 0.58μ, 0.64μ)
.param dpchw=opt1 (0.44μ, 0.40μ, 0.44μ)
.param ipasspw=opt 1 (0.30μ, 0.27μ, 0.33μ)
.param ipassnw=opt 1 (0.30μ, 0.27μ, 0.33μ)
.param mdrvpw=opt 1 (0.36μ, 0.33μ, 0.39μ)
.param mdrvnw=opt 1 (0.24μ, 0.21μ, 0.27μ)
.param mspasspw=opt 1 (0.24μ, 0.21μ, 0.27μ)
.param mspassnw=opt 1 (0.24μ, 0.21μ, 0.27μ)
.param sdrvpw=opt 1 (0.31μ, 0.27μ, 0.35μ)
.param sdrvnw=opt 1 (0.21μ, 0.18μ, 0.24μ)
. . .
Set spice to monitor to concurrent goals (10 percent pushout on clk2q to derive rising data setup, the same for falling data setup . . . falling data setup equal to rising data setup, and falling data clk2q timing equal to rising data clk2q timing)
. . .
.tran 1 ps 'tsim' sweep optimize=opt1
+results=pushout_oper_rd,pushout_per_fd,tsu_fd, tfd_ck2q_gold
+model=optmod At step 614, the layout is altered with the optimal design widths. At step 616, the circuit is then recharacterized to ensure proper operation.

Hence, the embodiments disclosed provide techniques for altering component sizes in a flip-flop to provide minimal sequential overhead. Reduction in overconstrained paths due to rise/fall setup time disparities, which also leads to excessive power consumption as a result of the requirement of meeting large setup times, are overcome by the disclosed embodiments, which equalizes the setup times. Equalization of clock to Q delays for both rising and falling data is also achieved in accordance with the disclosed embodiments. The disclosed embodiment utilizes hspice optimization routines so that concurrent goals can be set for rising data setup, falling data setup, rising clock to Q and falling clock to Q delays to achieve substantially equal rising/falling data setup times, as well as rising/falling clock to Q delays.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of reducing sequential overhead in a latching circuit design by adjusting rising and falling data setup times and clock to Q delays of rising and falling data transitions in a computer, wherein said computer performs the processes comprising:

creating an initial latching circuit design in said computer using a device library;

using library test cells of said device library in said computer to determine slew rates for combinational logic in said initial latching circuit;

using said slew rates for said combinational logic of said initial latching circuit to determine said rising and falling data setup times and clock to Q delays of said rising and falling data transitions in said computer;

altering device widths of said combinational logic of said initial latching circuit design in said computer to alter said slew rates so that said rising and falling data setup times are substantially equal, said clock to Q delays are substantially equal for said rising and falling data transitions, and said clock to Q delays are not increased by more than approximately ten percent, to generate a latching circuit design in said computer that is substantially polarity independent and has reduced sequential overhead.

2. The method of claim 1 wherein said process of altering device widths further comprises:
using hspice optimization routines to set concurrent goals for data setup times for both rising and falling data signals, and clock to Q delays for said rising and falling transitions.

3. The method of claim 2 wherein said process of altering said device widths further comprises:
using representative slew rates during hspice optimization for rising and falling data input transitions that are stored in said device library.

4. The method of claim 3 wherein said process of altering said device widths of said combinational logic of said initial circuit design comprises:
altering device widths of said combinational logic of said initial circuit design except for input and output inverters.

* * * * *